US00RE39638E

(19) United States
(12) Reissued Patent
Klein et al.

(10) Patent Number: US RE39,638 E
(45) Date of Reissued Patent: May 22, 2007

(54) HANGING SHOE RACK

(75) Inventors: Richard B. Klein, Overland Park, KS (US); Chris Serslev, Leawood, KS (US)

(73) Assignee: Lynk, Inc., Lenexa, KS (US)

(21) Appl. No.: 09/457,658

(22) Filed: Dec. 9, 1999

Related U.S. Patent Documents

Reissue of:
(64) Patent No.: 5,695,073
Issued: Dec. 9, 1997
Appl. No.: 08/630,364
Filed: Apr. 10, 1996

(51) Int. Cl.
*A47F 5/00* (2006.01)

(52) U.S. Cl. ..... 211/35; 211/113; 211/118; 248/214; 248/300

(58) Field of Classification Search ..... 211/35, 211/34, 113, 118, 193, 194; 248/301, 364, 248/214, 300
See application file for complete search history.

(56) References Cited

U.S. PATENT DOCUMENTS 1,674,359 A * 6/1928 Frey ..... 211/43
1,769,344 A * 7/1930 Hoffmire
2,090,108 A * 8/1937 Cicero ..... 211/35
2,238,884 A * 4/1941 Hoffman ..... 211/38
2,299,021 A * 12/1942 Hoffman ..... 211/34
D139,415 S * 11/1944 Brown ..... 211/35 X
2,469,542 A * 5/1949 Becker ..... 211/35 X
2,620,929 A * 12/1952 Sportsman ..... 211/42
2,682,955 A * 7/1954 Moore ..... 211/35
3,171,542 A * 3/1965 Jacobs et al. ..... 211/43
3,391,793 A * 7/1968 Streuli ..... 211/43
3,918,670 A * 11/1975 Doherty ..... 211/35 X
3,999,734 A * 12/1976 Gibson et al. ..... 248/460
4,199,070 A * 4/1980 Magnussen, Jr. ..... 211/194 X
4,209,098 A * 6/1980 Adams ..... 211/60.1
4,245,746 A * 1/1981 Aylor ..... 211/40
4,457,436 A * 7/1984 Kelley ..... 211/88.01
4,607,753 A * 8/1986 Radek ..... 211/87.01
4,657,148 A * 4/1987 Heng ..... 211/128.1
4,678,151 A * 7/1987 Radek ..... 248/220
4,688,681 A * 8/1987 Bergeron ..... 211/36
4,688,687 A * 8/1987 Pryor ..... 211/189
4,711,419 A * 12/1987 Polosky ..... 248/225
4,805,783 A * 2/1989 Mayer ..... 211/94.01
4,825,601 A * 5/1989 Halverson ..... 52/36
4,899,971 A * 2/1990 Elkin ..... 248/225.1
4,942,498 A * 7/1990 Toussaint ..... 361/388

(Continued)

OTHER PUBLICATIONS

Kann's Notions & Toiletries Catalog, Sep. 17, 1951.*

*Primary Examiner*—Jennifer E. Novosad
(74) *Attorney, Agent, or Firm*—Blackwell Sanders Peper Martin LLP

(57) ABSTRACT

A hanging shoe rack for supporting shoes in an angular manner. A pair of side frame members having an elongate body section. A plurality of support arms project outwardly and downwardly from each main body section. Pairs of retaining bars are positioned between said frame members and are aligned in a plane forming an acute angle with respect to vertical, to thereby support thereon shoes in an angular manner, with the shoes directed downwardly toward a vertical surface upon which the shoe rack is placed. The support arms, upon opposite side frames, traverse side sections of the shoes to form a barrier against lateral movement of the shoes. Unique socket structure, into which the retaining bars are positioned, permit easy assembly of the shoe rack. Additionally, each side frame member includes unique attachment structure, upon upper and lower ends thereof, so that multiple shoe racks of the present invention may be vertically suspended one from another. A unique hanger is provided for hanging the rack over the top of an upright surface, such as a door.

13 Claims, 3 Drawing Sheets

U.S. PATENT DOCUMENTS 5,035,332 A * 7/1991 Stravitz ..... 211/40
5,048,698 A * 9/1991 Konrad ..... 211/45
5,054,629 A * 10/1991 Breen ..... 211/128.1
5,078,270 A * 1/1992 Campbell ..... 211/194 X
5,082,125 A * 1/1992 Ninni ..... 211/184
5,097,968 A * 3/1992 Gregory ..... 211/94.01
5,101,986 A * 4/1992 Holztrager ..... 211/13.1
5,101,989 A * 4/1992 Jones ..... 211/94.01
5,152,407 A * 10/1992 Massoudnia et al. .... 211/181.1
5,172,816 A * 12/1992 Kline et al. ..... 211/37
D381,225 S 7/1997 Malik ..... D6/513
D398,787 S 9/1998 Malik ..... D6/411
D403,880 S 1/1999 Malik ..... D6/411

* cited by examiner

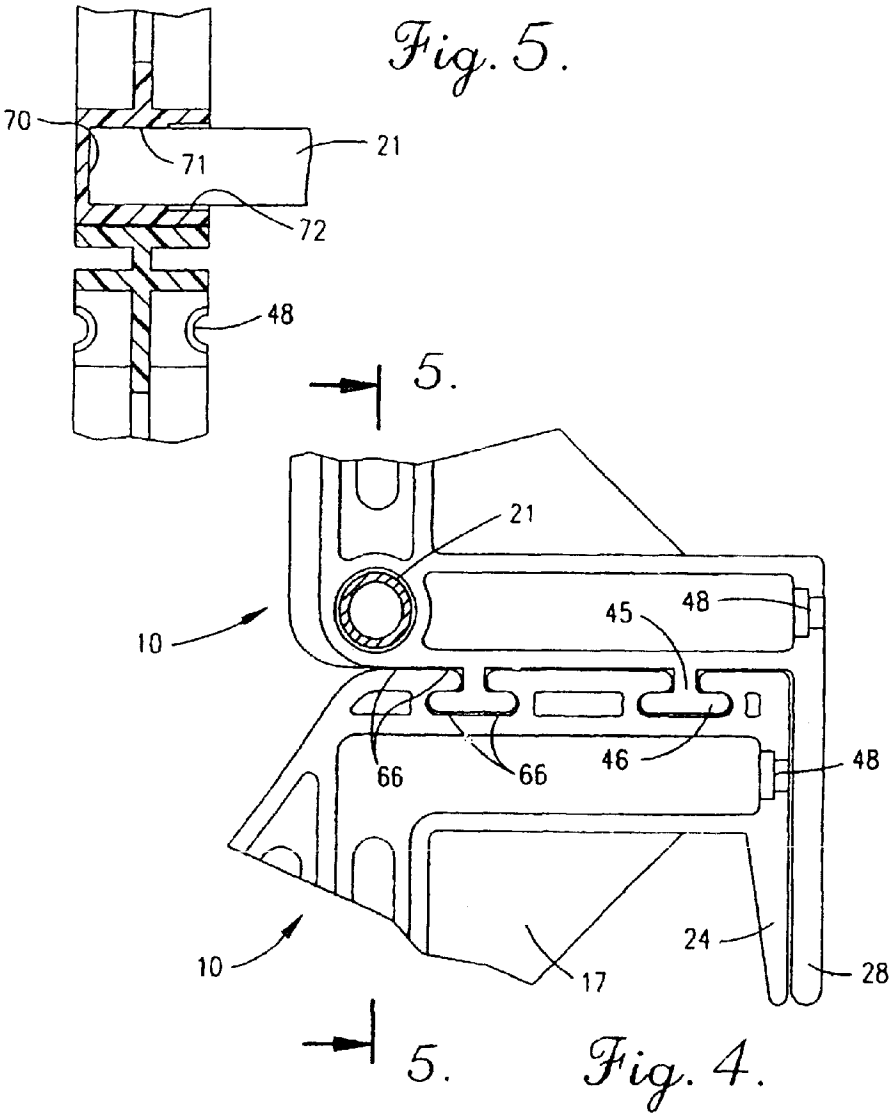
Fig. 4.
Fig. 5.
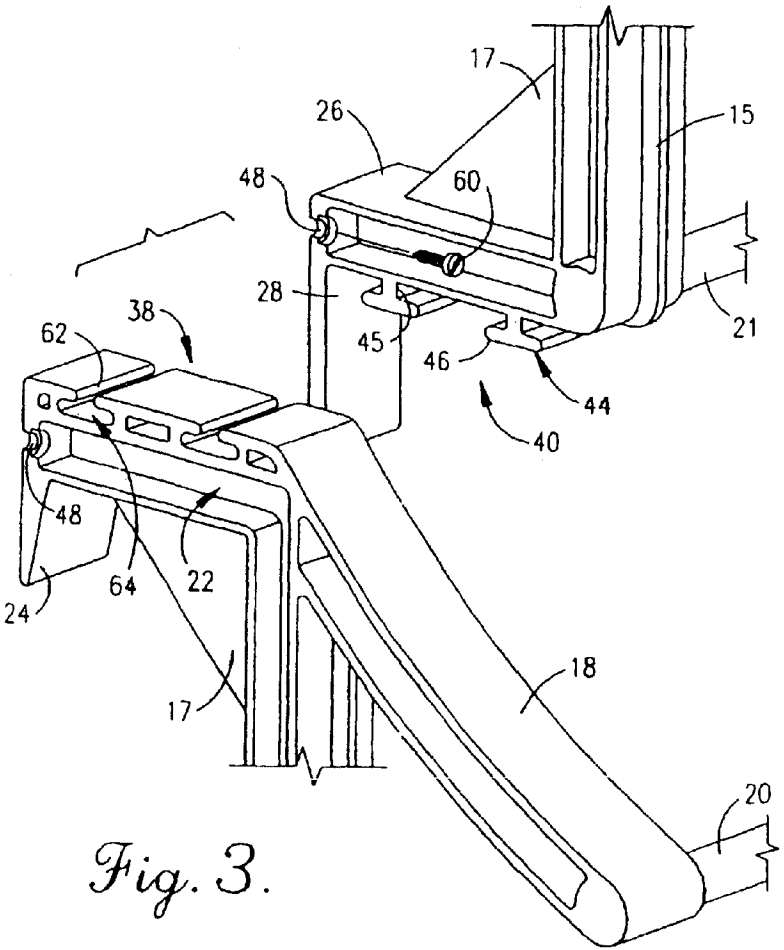
Fig. 3.

HANGING SHOE RACK

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is generally directed to a hanging shoe rack. More particularly, the present invention is directed to a hanging shoe rack which supports the shoes in an inclined manner, such that each shoe is sloped downwardly toward the vertical surface upon which the shoe rack is attached. Additionally, the hanging shoe rack of the present invention contains attachment structure allowing multiple such racks to be suspended from one another.

2. Description of the Related Art

Numerous types of shoe racks have been developed for storing shoes in a convenient manner. For instance, U.S. Pat. No. 2,682,955 (Moore) illustrates a reversible shoe rack having a shoe support pivotally mounted to a side frame. The shoe support includes front and rear support bars which retain the shoe in an inclined manner, such that the toe of the shoe is angled downwardly and abuts against the wall supporting the shoe rack. U.S. Pat. No. 4,688,681 (Bergeron) discloses a foot apparel storage assembly which includes shelves supported at a base upon a back plate. The shelves are inclined downwardly toward a supporting wall such that shoes positioned on the shelf are inclined downwardly toward the wall. U.S. Pat. No. 1,769,344 (Hoffmire) discloses a portable shoe rack wherein paddles extend outwardly from a back brace in a manner to support shoes in an inclined manner such that the toe of a shoe is angled downwardly and abuts against the back brace. U.S. Pat. No. 2,238,884 (Hoffman) and U.S. Pat. No. 2,090,108 (Cicero) illustrate shoe racks for hanging on a vertical surface, such as a wall or the back of a door.

One known prior art shoe rack has a pair of elongate, spaced-apart base members for abutting with a door or wall upon which the shoe rack hangs. Each base member has a plurality of outwardly extending side bars, wherein corresponding side bars of the base members have a pair of spaced-apart rod members extending therebetween for supporting shoes. The side bar members are inclined upwardly as they extend from the base members. Thus, shoes positioned on the rod members incline downwardly towards the supporting surface of the rack. Additionally, this known prior art shoe rack is modular in nature, thereby permitting additional such racks to be attached to it in a suspended manner.

A primary problem with conventional shoe racks, including the known modular shoe rack previously described, is their inability to prevent shoes from sliding sideways off the rack without an additional side support member for blocking the shoes. Thus, those prior art shoe racks which do not provide such a side support member have difficulty in retaining shoes on the rack, particularly where the rack is positioned on a closet door. It will be appreciated that, as the door is swung open and closed, the shoes on the rack are forced toward the side of the rack and, in the absence of a side supporting member, may fall from the rack. Alternatively, those racks which provide a side support member are more structurally complex and costly to manufacture due to the addition of the side support members.

Additionally, a known problem with the heretofore described prior art modular shoe rack is the inability to retain suspended members in a rigid position relative to the shoe racks with which it is connected, particularly when the racks are positioned on a swinging door, as described above. In this regard, the known prior art modular hanging shoe rack previously described utilizes a pair of posts extending rearwardly from an upper portion of the base members. A lower portion of the base members have a pair of apertures such that the posts at the upper portion of a first shoe rack are inserted into the apertures at a lower portion of a second shoe rack. However, when such a modular shoe rack is placed on a door, these lower shoe rack portions have a tendency to swing from side-to-side as the doors open and close. This increases the likelihood of shoes falling from the racks, particularly where no side support structure is provided. Additionally, the suspended racks bow outwardly from the door, causing them to flop when the door is opened and closed and creating a space through which shoes slip.

Accordingly, the need exists for an inexpensive hanging shoe rack having side supporting members and a minimum number of parts. The need also exists for a modular hanging shoe rack which allows multiple racks to be suspended from one another and which engage one another in a manner to resist lateral displacement therebetween. The present invention fills these and other needs, and overcomes the drawbacks associated with prior art shoe racks.

SUMMARY OF THE INVENTION

It is an object of the present invention to support shoes in an inclined manner sloped downwardly toward a surface upon which the shoe rack is supported.

It is a further object of the present invention to prevent the shoes from sliding laterally off of a shoe rack made in accordance with the principles of the invention.

It is a further object of the present invention to provide an inexpensive hanging shoe rack, for supporting shoes in an inclined manner sloped downwardly toward the door, with side support members for abutting against the shoes to prevent the shoes from sliding off the rack, all with a minimal number of parts.

It is a further object of the present invention to suspend multiple shoe racks from one another in a manner to prevent lateral displacement therebetween.

These and other objects are achieved by a shoe rack having side frame members which securely retain a plurality of shoe-retaining bars therebetween. The side frame members include a main body section and a plurality of support arms projecting outwardly therefrom. The support arms are angled downwardly from their respective main body section.

The side frame members are secured to, or hang from, a vertical surface, such as a wall or a door, such that a corresponding pair of support arms upon opposed side frame members securely retain opposite ends of a first retaining bar, positioning proximate an outer end of each support arm. This first, outer retaining bar is adapted to receive a first portion of the sole of a shoe. The main body portions of the side frames receive opposite ends of the second retaining bar adapted to support a second portion of the shoe. The pairs of shoe-retaining bars are aligned in a plane forming an acute angle with respect to vertical, to thereby support the shoes in an inclined manner with the shoes directed downwardly toward the door or wall. Additionally, and in accordance with a key aspect of the present invention, the support arms upon opposite side frames traverse the side sections of the shoes to form a barrier against lateral movement of the shoes, thereby preventing the shoes from falling off the rack as the doors open and close.

The present shoe rack also includes unique attachment structure upon the upper and lower ends of the side frames for suspending shoe racks from one another. Particularly, an upper portion of each side frame member of the shoe rack includes upper attachment structure, while a lower portion of each side frame member includes lower attachment structure. The upper attachment structure of a first shoe rack of the present invention is adapted to mate with the lower attachment structure of a second shoe rack of the present invention, to thereby suspend the two shoe racks together. The upper attachment structure includes a pair of spaced-apart slots, while the lower attachment structure includes a pair of spaced-apart male members. The male members are adapted to be slidingly introduced, in a sidewise fashion, into position within the female channels, to thereby interconnect two shoe racks of the present invention together.

BRIEF DESCRIPTION OF THE DRAWINGS

The objects and features of the invention noted above are explained in more detail with reference to the drawings, in which like reference numerals denote like elements, and in which:

FIGS. 3 and 4 are enlarged fragmentary views, illustrating the attachment structure of the present invention; and FIG. 5 is a cross-sectional view taken along line 5—5 of FIG. 4.

DETAILED DESCRIPTION OF THE INVENTION

Figure 1:
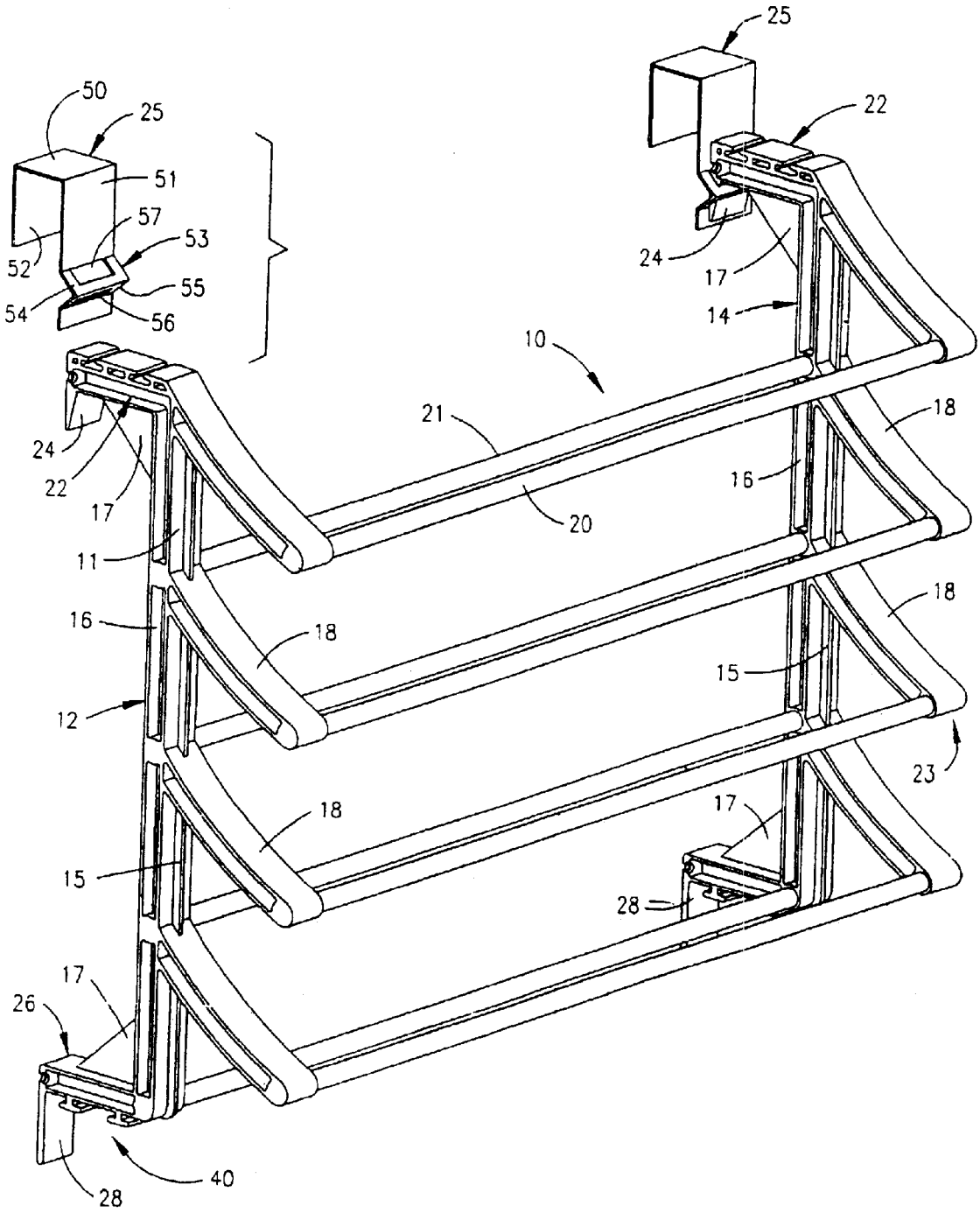
FIG. 1 is a left, frontal perspective view of a shoe rack according to the present invention.

With reference initially to FIG. 1, a modular hanging shoe rack of the present invention is denoted generally by reference numeral 10. Shoe rack 10 has first and second side frame members 12, 14. Each side frame member 12, 14 includes a main, elongate body section 16 and a plurality of support arms projecting outwardly from a front face 11 thereof. As shown, each support arm 18 angles downwardly, at approximately a 45° angle, from its corresponding main body section 16. Side frame sections 12, 14 are preferably integrally molded from plastic.

Figure 2:
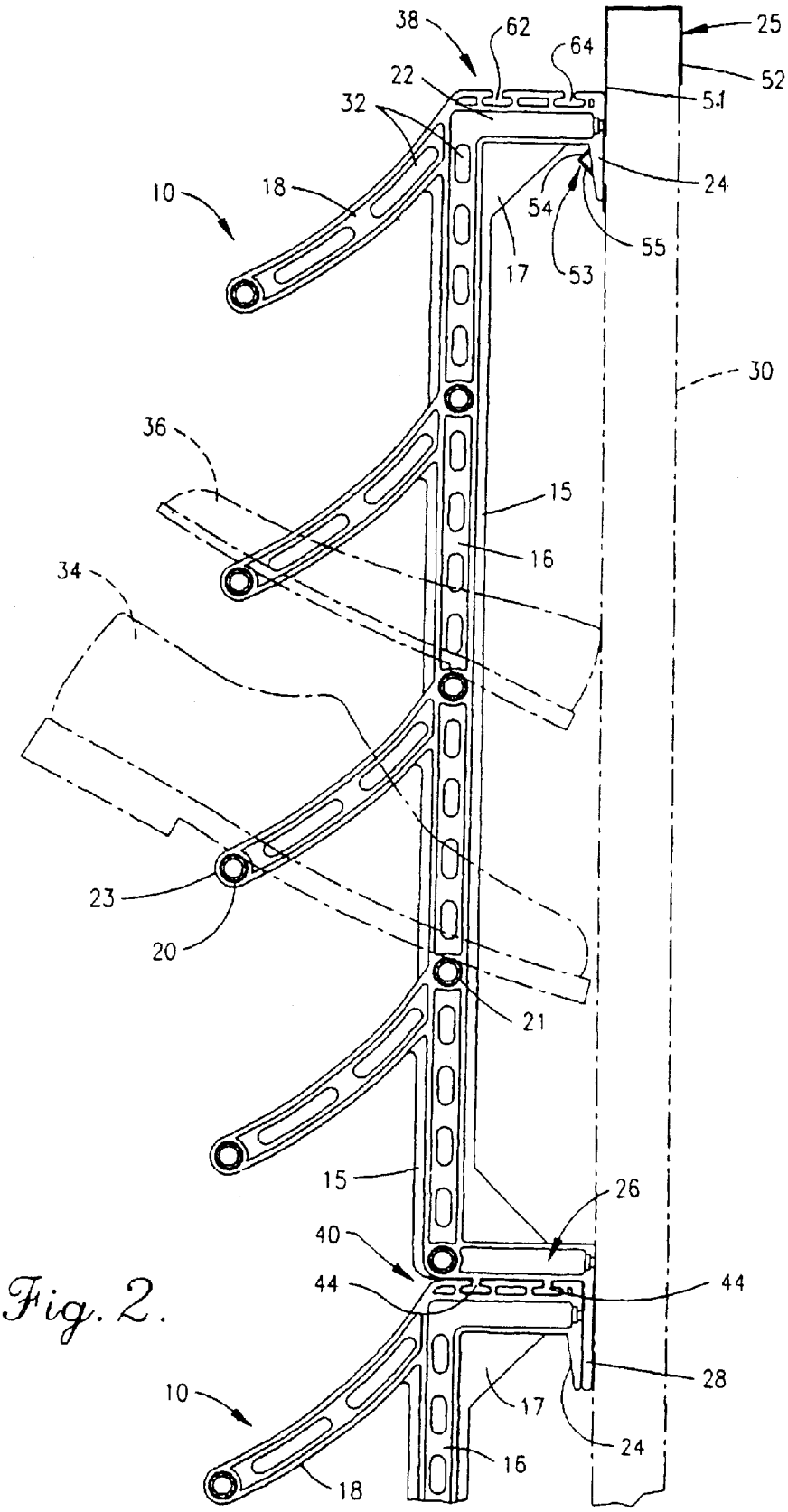
FIG. 2 is a side elevational view illustrating the modular hanging shoe rack of the present invention.

With additional reference to FIG. 2, each side frame member 12, 14 is preferably generally constructed in the form of an I-beam (see FIG. 5) and has, at front face 11 thereof, a plurality of reinforcing ribs 15 extending between the support arms 18. Each side frame member 12, 14 also includes an upper leg 22 extending rearwardly from a rear face of its corresponding main, elongate body section 16. Upper legs 22 terminate in depending foot portions 24 for engaging with a vertical surface upon which the shoe rack 10 hangs. Each side frame member 12, 14 also includes a lower leg 26 extending rearwardly from a lowermost portion of a corresponding elongate body section 16, and terminating in a downwardly depending lower foot portion 28. Lower foot portion 28 is also adapted to engage with the vertical surface upon which the shoe rack 10 hangs. As shown, gussets 17 are provided for strengthening the relationship between main body section 16 and the legs 22, 26. As described in greater detail below, each upper leg 22 has, at an upper portion thereof, upper attachment structure 38 and each lower leg 26 has, at a lower portion thereof, lower attachment structure 40. The attachment structure 38 of a first shoe rack 10 and the attachment structure 40 of a second shoe rack 10 permit two shoe racks 10 to be combined in suspended fashion.

Each bar of a first plurality of shoe-retaining bars, each bar designated by the reference numeral 20, is fixedly retained between side frame members 12, 14. Particularly, a corresponding pair of support arms 18 upon opposed side frame members 12, 14 have sockets which securely retain opposite outer ends of a retaining bar 20 proximate an outer end 23 of the respective support arms 18. Retaining bars 20 support a first portion of the sole of a shoe, such as shoes 34, 36. The elongate body portions 16 of side frame members 12, 14 also have sockets, each socket preferably located at a position proximate an upper end of a support bar 18, which sockets receive opposite ends of each of a plurality of second retaining bars 21, each of which bars 21 is adapted to support a second sole portion of a shoe. As shown, pairs of shoe-retaining bars 20, 21 are aligned in a plane forming an acute angle with respect to vertical, to thereby support the shoes 34, 36 in an inclined manner with the shoes directed toward the vertical surface 30 upon which shoe rack 10 is supported.

Each side frame member 12, 14 is preferably fabricated as one integral piece of plastic and has openings 32 therethrough. Specifically, each side frame member 12, 14 is preferably formed of thermal plastic molding compound. Retaining bars 20, 21 are preferably formed of lightweight, sturdy material, such as aluminum or steel. It will be appreciated that side frame members 12, 14 and retaining bars 20 can be constructed of any suitable material, such as plastic or wood, or any combination thereof.

Shoe rack 10 is adapted to be supported on a vertical surface, such as a wall or door. For hanging shoe rack 10 over a door, such as door 30 illustrated in FIG. 2, a pair of hangers 25 are placed over the top of door 30, and engage with shoe rack 10, to support shoe rack 10 in suspended fashion in engagement with the vertical surface of the door. Each hanger 25 is preferably in the form of a metallic bracket having a horizontal upper portion 50 and downwardly depending front and rear portions 51, 52, respectively, depending downwardly from respective front and rear edges of the upper horizontal surface. Preferably, the downwardly depending front portion 51 includes a portion, designated by the reference numeral 53, angled into a V-shape including angled portions 54, 55 which meet at an outwardly protruding apex 56. Each angled portion 54, 55 includes an opening 57 adapted to receive an upper foot 24 of the corresponding side frame member 12, 14 of shoe rack 10. The inverted "U" formed by each hanger 25 is adapted to hang over the top of door 30, as shown in FIG. 2, thus rigidly supporting shoe rack 10 in suspended fashion on door 30.

In addition to hanger 25, or alternatively, fasteners, such as fastener 60 shown in FIG. 3, may be inserted through fastener sockets 48 and into the vertical support surface to retain shoe rack 10 in place on the surface 30. Preferably, fastener sockets 48 are positioned along each outer side edge of the outwardly-most extending portion of foot members 24, 26.

In FIG. 2, shoe rack 10 is shown from the side in a position hanging suspended from a vertical surface, such as door 30. Shoes 34, 36, shown in broken lines, are positioned on retaining bars 20 in a preferred manner. Particularly, a first sole portion of each shoe rests on an outer retaining bar 20, while a second sole portion of each shoe rests on a corresponding inner retaining bar 21. In this manner, shoes 34, 36 are positioned in an incline, angular manner, with one end of each shoe 34, 36 abutting the vertical surface 30 upon which shoe rack 10 is hung. It has been found that, with most shoes, it is preferred that the toe of the shoe be inclined downwardly into abutment with the vertical surface. However, some shoes, such as women's flats (as shown by shoe 36) may be just as conveniently positioned on shoe rack 10 in an opposite manner.

In accordance with a key principle of the present invention, FIG. 2 illustrates the manner in which shoe rack 10 securely retains shoes 30, 36 between side frame members 12, 14 of shoe rack 10. Particularly, a support arm 18 provides a side frame member which traverses a side section of a respective shoe, to thereby perform a barrier against lateral movement of the shoe beyond the side edge of the shoe rack 10. Respective support arms 18 thus prevent corresponding shoes 34, 36 from falling off the shoe rack 10, particularly when shoe rack 10 is positioned on a door that is opened and closed in a swinging manner.

With additional reference now to FIGS. 3–5, the attachment structure for permitting multiple shoe racks to be suspended one from the other is illustrated and described.

As shown in FIG. 3, lower attachment structure, designated generally by the reference numeral 40, includes a pair of male members 44 extending downwardly from a lower side surface of lower leg 26 of each side frame member 12, 14 of an upper shoe rack 10 of the present invention. Each downwardly extending male member 44 includes a relatively narrow extension member 45 terminating in an enlarged head 46. Additionally, upper attachment structure 38 at an upper surface of upper legs 22 includes relatively narrow slots 62 opening into an enlarged channel 64. As will be readily appreciated, downwardly depending male members 44 positioned on a lower leg 26 of a shoe rack 10 are adapted to be received by the female attachment structure 38 positioned on an upper leg 22 of a second shoe rack 10 of the present invention. It will be understood that FIG. 3 illustrates only one side of the shoe racks, but that the other side of shoe rack 10 will operate in the same manner. Particularly, extension members 45 are adapted to be snugly received within narrow openings 62, and enlarged heads 46 of male members 44 are adapted to be snugly received within channels 64. In order to suspend one shoe rack 10 from the other, the male members 44 are aligned with the openings of the female attachment structure, and the two shoe racks 10 are moved sidewise relative to each other so that the male members 44 are completely received within the female attachment structure, as illustrated in FIG. 4.

As also shown in FIG. 4, the lower side surface of lower legs 26 of each main body section 16 of the present invention, as well as the lower side surface of each enlarged head 46 of male members 44 have small projecting ribs, denoted generally by the reference numbers 66, which serve as gripping nodules. The ribs 66 preferably do not extend all the way to the outer edges of the surfaces from which they extend. Such an arrangement permits the racks to be easily assembled because the racks begin sliding together, and then the ribs cause a wedging effect. Particularly, those ribs 66 on the bottom surface of the male members 44, create a desirable frictional fit between shoe racks 10.

As illustrated in FIGS. 2 and 4, each upper foot 24 of a lower shoe rack 10 suspended from an upper shoe rack 10 engages with the lower foot 28 of the upper shoe rack 10. Lower foot 28 of upper shoe rack 10 in turn engages with the vertical surface 30, as previously described.

With reference now to FIG. 5, a cross-sectional view taken along line 5—5 of FIG. 4, the general I-beam structure of the components of the present invention is illustrated. Additionally, FIG. 5 illustrates one of the plurality of sockets utilized by the present invention for receiving an outer end of a retaining bar such as, in this instance, a retaining bar 21. In accordance with a principal aspect of the present invention, receiving sockets 70 include a first portion 71 having an inner diameter and a second portion 72 having an outer diameter, the outer diameter being slightly greater than the inner diameter. It has been found that this arrangement permits the structure to be easily assembled.

Specifically, during assembly, a first side frame member, such as side frame member 12, may be laid on a flat surface, and the various retaining bars 20, 21 loosely positioned within the second, outer portion 72 of corresponding receiving sockets 70. Side frame member 14 may then be positioned downwardly onto the retaining bars, wherein the retaining bars are similarly loosely positioned within the outermost large diameter portion 72 of the receiving sockets. It will be appreciated that, with the retaining bars 20, 21 only loosely positioned within the sockets within the larger diameter areas 72, the bars are less rigid than when snugly secured within the innermost, smaller diameter area 71 of the receiving sockets 70. As such, the bars 20, 21 may be manipulated to align with the receiving sockets on the opposing side frame member 14, so that the bars may be placed within the larger diameter area of corresponding receiving sockets in the side frame member 14. Once all the bars are properly aligned, and loosely positioned within the outer, larger diameter area 72 of corresponding receiving sockets 70, the side frame members 12, 14 may be depressed together, thus forcing the bars 20, 21 into the innermost, smaller diameter areas of the receiving sockets 70, thereby figidly attaching the retaining bars to the side frame members 12, 14. The receiving socket structure of the present invention, having the first and second peripheral dimensions of different sizes, facilitates insertion and alignment of retaining bars 20, 21 and the overall easy assembly of shoe rack 10.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Sine many possible embodiments may be made of the invention without departing from the scope thereof, it is to be understood that all matter herein set forth or shown in the accompanying drawings is to be interpreted as illustrative, and not in a limiting sense.

What is claimed is:

1. A shoe rack, for hanging on an upright surface, said shoe rack comprising:

first and second opposed side frame members, each said side frame member having a main body section and a plurality of support arms projecting outwardly, and angled downwardly, from said main body section;

a plurality of shoe-retaining bars, extending between said side frame members, for retaining shoes, wherein said shoe-retaining bars are oriented in pairs, each said pair of shoe-retaining bars aligned in a plane forming an acute angle with respect to vertical, to thereby support shoes in an angular manner, with the shoes directed downwardly toward the upright surface, and wherein said support arms upon opposite said side frames traverse the side sections of the shoes to form a barrier against lateral movement of the shoes.

2. The shoe rack, according to claim 1, wherein each said pair of shoe-retaining bars includes a first retaining bar, positioned proximate an outer end of a corresponding pair of said support arms on said opposed side frame members, and a second retaining bar, extending between said main body portions of said side frame members, wherein said second retaining bar is oriented vertically lower than said first retaining bar.

3. The shoe rack, according to claim 2, wherein each said side frame member includes an upper and lower leg extending outwardly for engagement with said upright surface, thereby positioning said main body sections in a location that is spatially removed from said upright surface.

4. The shoe rack, according to claim 3, wherein each of said upper and lower legs terminate in a downwardly extending upper and lower foot member, respectively.

5. The shoe rack, according to claim 4, further comprising a pair of hangers, each of said hangers for engaging with respective ones of said upper leg members and said upper foot members, and also for engaging over a top of said upright surface.

6. A shoe rack, according to claim 1, wherein each of said upper and lower leg members further comprise attachment structure for attaching a shoe rack thereto.

7. A device for placing articles thereon, said device comprising:

at least one rod member having first and second outer ends;

first and second frame members, each said frame member having a socket with a closed end and an open end therein to receive the outer ends, each said socket having an inner portion having a first peripheral dimension adjacent the closed end, and an outer portion having a second peripheral dimension adjacent the open end, wherein said second peripheral dimension is greater than said first peripheral dimension, wherein said first and second outer ends of said rod member are received within respective said sockets, and wherein said outer ends of said rod member are loosely received with said outer portion, and snugly received within said inner portion of said socket.

8. The device according to claim 7, wherein each said frame member has a plurality of said sockets having said first and second portions, the first peripheral dimension is constant, the second peripheral dimension is constant and further comprising a plurality of rod members adapted to be received within corresponding sockets of said frame members.

9. The device according to claim 7, wherein corresponding sockets of pairs of said sockets of said frame members are in alignment when said frame members are positioned in opposed relationship to each other.

10. A shoe rack comprising:

first and second frame members, each said frame member having an elongate body section, with an upper and a lower end, an upper leg member extending outwardly from said upper end of said body section, and a lower leg member extending outwardly from said lower end of said body section;

at least one pair of retaining bars, extending between said first and second frame members, for retaining shoes thereon; and attachment structure for attaching the shoe rack to an identical second shoe rack, said attachment structure comprising upper attachment structure located on each said upper leg and lower attachment structure located on each said lower leg, wherein one of said upper attachment structure and said lower attachment structure comprises a channel and the other of said upper attachment structure and said lower attachment structure comprises an extending male member, wherein said channel of said shoe rack is adapted to mate with a male member of the other shoe rack, to thereby interconnect the two shoe racks, wherein said upper attachment structure comprises a slot opening into said channel, and said lower attachment structure comprises said extending male member, said extending male member including an enlarged outer head, wherein said enlarged outer head of extending male member of said shoe rack is adapted to be received within a channel of said second shoe rack, and wherein said channel and said male member slidingly engage in sidewise fashion, and further, wherein said male member has at least one rib protecting outwardly from a head thereof.

11. The shoe rack, according to claim 10, wherein said head has outer edges and said rib does not extend to said outer edges.

12. A shoe rack, for hanging on a vertical surface, said shoe rack comprising:

first and second side frame members, each said side frame member being identically formed of plastic, and comprising an elongate body section, having a front face and a rear face;

a plurality of support arms projecting outwardly, and angled downwardly at approximately a 45° angle with respect to horizontal, from said front face of said elongate body section of each of said first and second side frame members;

an upper leg extending outwardly from said rear face of each said elongate body section proximate an upper end thereof;

a lower leg extending from each said elongate body section proximate a lower end thereof, each of said upper and lower legs terminating in a downwardly extending foot portion for engaging with said vertical surface;

a first plurality of sockets, positioned on each said frame member, wherein each socket of said first plurality is located proximate an outer end of a corresponding said support arm;

a second plurality of sockets, positioned on each said frame member, wherein each socket of said second plurality is located along said elongate body section of said frame member;

wherein each said socket of said first and second plurality of sockets has a first inner portion of a first peripheral dimension and a second outer portion of a second peripheral dimension, wherein said second peripheral dimension is greater than said first peripheral dimension;

a first plurality of shoe-retaining rods, each said rod of said plurality extending between said frame members and snugly positioned within said first, inner areas of corresponding sockets of said first plurality of sockets;

a second plurality of shoe-retaining rods, each said rod of said second plurality positioned between said first and second frame members and snugly positioned within said inner portion of corresponding sockets of said second plurality of sockets;

wherein each said retaining rod of said first plurality and said second plurality of retaining rods form one of a pair of a plurality of retaining rod pairs, each said retaining rod pair comprising one retaining rod from said first plurality of retaining rods and one retaining rod from said second plurality of retaining rods, wherein said retaining rod of each said pair taken from said first plurality of retaining rods is oriented vertically higher than its corresponding paired retaining rod of said second plurality of rods, wherein said pairs of retaining rods are adapted to support thereon shoes having side sections, and wherein said shoe-retaining rods of said pairs are aligned in a plane forming an acute angle with respect to vertical, to thereby support the shoes in an angular manner with the shoes directed toward said vertical surface;

wherein said support arms upon said side frame members traverse said side sections of the shoes to form a barrier against lateral movement of the shoes, thereby preventing the shoes from laterally falling off the shoe rack; and upper and lower attachment structure, positioned on said upper and lower legs, respectively, for permitting multiple said shoe racks to be suspended together in vertical orientation, wherein said upper attachment structure comprises at least one female channel, and said lower attachment structure comprises at least one downwardly projecting male member, said female channel of a first said shoe rack adapted to mate with said male member of a second said shoe rack to thereby vertically suspend the said shoe racks together.

*13. A shoe rack, for hanging on an upright surface, said shoe rack comprising:*

*first and second opposed side frame members, each said side frame member having a main body section and a plurality of support arms projecting outwardly from a front face of said main body section, wherein each said side frame member includes an upper and lower leg extending outwardly from a rear face of said body section for engagement with said upright surface, thereby positioning said main body sections in a location that is spatially removed from said upright surface;*

*a plurality of shoe-retaining bars, extending between said side frame members, for retaining shoes, wherein said shoe-retaining bars are oriented in pairs, each said pair of shoe-retaining bars aligned in a plane forming an acute angle with respect to vertical, to thereby support shoes in an angular manner, with the shoes directed downwardly toward the upright surface, and wherein said main body sections of said side frame members traverse the side sections of the shoes to form a barrier against lateral movement of the shoes.*

* * * * *